(12) United States Patent
Gorbold et al.

(10) Patent No.: US 8,061,832 B2
(45) Date of Patent: Nov. 22, 2011

(54) FAST-DRYING, RADIOFREQUENCY-ACTIVATABLE INKJET INKS AND METHODS AND SYSTEMS FOR THEIR USE

(75) Inventors: Jonathan M. Gorbold, Pittsford, NY (US); Timothy D. Gorbold, Scottsville, NY (US); David E. Brotton, Racine, WI (US); J. David Campbell, Racine, WI (US); Richard W. Chylla, Jr., Racine, WI (US); Jon A. Debling, Oak Creek, WI (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 12/419,859

(22) Filed: Apr. 7, 2009

(65) Prior Publication Data

US 2009/0189930 A1    Jul. 30, 2009

Related U.S. Application Data

(62) Division of application No. 11/260,779, filed on Oct. 27, 2005, now Pat. No. 7,520,600.

(60) Provisional application No. 60/522,721, filed on Nov. 1, 2004, provisional application No. 60/680,256, filed on May 12, 2005.

(51) Int. Cl.
*C09D 11/00* (2006.01)
(52) U.S. Cl. ....................................... 347/100
(58) Field of Classification Search .................. 347/100
See application file for complete search history.

(56) References Cited

U.S. PATENT DOCUMENTS

| 2,465,319 A | 3/1949 | Whinfield et al. |
| 2,901,466 A | 8/1959 | Kibler et al. |
| 3,018,272 A | 1/1962 | Griffing et al. |
| 3,033,822 A | 5/1962 | Kibler et al. |
| 3,033,826 A | 5/1962 | Kibler et al. |
| 3,033,827 A | 5/1962 | Kibler et al. |
| 3,075,952 A | 1/1963 | Coover, Jr. et al. |
| 3,574,031 A | 4/1971 | Heller, Jr. et al. |
| 3,661,614 A | 5/1972 | Bassemir et al. |
| 3,879,450 A | 4/1975 | Velker et al. |
| 4,037,777 A | 7/1977 | Maughan |
| 4,052,368 A | 10/1977 | Larson |
| 4,110,284 A | 8/1978 | Violland et al. |

(Continued)

FOREIGN PATENT DOCUMENTS

CA    2600281    5/2006

(Continued)

OTHER PUBLICATIONS

Office Action issued in U.S. Appl. No. 11/259,792 mailed May 4, 2009.

(Continued)

*Primary Examiner* — Laura Martin
(74) *Attorney, Agent, or Firm* — Foley & Lardner LLP

(57) ABSTRACT

The present invention provides methods of drying radiofrequency-activatable inkjet inks, methods for customizing the radiofrequency parameters of an RF source based on pre-selected printing conditions, and methods for selecting or formulating an RF inkjet ink composition based on pre-selected printing conditions and/or printing equipment. The invention further provides radiofrequency-activatable inks having customized radiofrequency susceptibility profiles and to sets of such radiofrequency-activatable inks.

17 Claims, 2 Drawing Sheets

U.S. PATENT DOCUMENTS

| | | | |
|---|---|---|---|
| 4,233,196 A | 11/1980 | Sublett | |
| 4,233,901 A | 11/1980 | Mallinson | |
| 4,257,928 A | 3/1981 | Vachon et al. | |
| 4,278,578 A | 7/1981 | Carpenter | |
| 4,283,427 A | 8/1981 | Winters et al. | |
| 4,304,900 A | 12/1981 | O'Neill | |
| 4,304,901 A | 12/1981 | O'Neill et al. | |
| 4,340,893 A | 7/1982 | Ort | |
| 4,360,607 A | 11/1982 | Thorsrud et al. | |
| 4,408,532 A | 10/1983 | Incremona | |
| 4,490,593 A | 12/1984 | Cook | |
| 4,525,524 A | 6/1985 | Tung et al. | |
| 4,598,142 A | 7/1986 | Hilbert et al. | |
| 4,617,343 A | 10/1986 | Walker et al. | |
| 4,692,366 A | 9/1987 | Mudge | |
| 4,696,951 A | 9/1987 | Lunsford et al. | |
| 4,707,402 A | 11/1987 | Thorsrud | |
| 4,713,263 A | 12/1987 | Lunsford et al. | |
| 4,847,155 A | 7/1989 | Lancaster et al. | |
| 4,910,292 A | 3/1990 | Blount | |
| 4,948,822 A | 8/1990 | Iovine et al. | |
| 4,973,656 A | 11/1990 | Blount | |
| 4,990,593 A | 2/1991 | Blount | |
| 5,037,700 A | 8/1991 | Davis | |
| 5,086,570 A | 2/1992 | Matheus | |
| 5,098,962 A | 3/1992 | Bozich | |
| 5,182,134 A | 1/1993 | Sato | |
| 5,182,328 A | 1/1993 | Iacoveillo et al. | |
| 5,220,141 A | 6/1993 | Quick et al. | |
| 5,220,346 A | 6/1993 | Carreira et al. | |
| 5,272,210 A | 12/1993 | Galante | |
| 5,281,630 A | 1/1994 | Salsman | |
| 5,286,415 A | 2/1994 | Buckley et al. | |
| 5,286,504 A | 2/1994 | Sheen et al. | |
| 5,319,020 A | 6/1994 | Rosenski et al. | |
| 5,328,539 A | 7/1994 | Sato | |
| 5,371,133 A | 12/1994 | Stanley | |
| 5,378,879 A | 1/1995 | Monovoukas | |
| 5,423,260 A | 6/1995 | Goldberg et al. | |
| 5,437,595 A | 8/1995 | Smith | |
| 5,464,575 A * | 11/1995 | Jaffiol et al. | 264/443 |
| 5,487,614 A | 1/1996 | Hale | |
| 5,488,907 A | 2/1996 | Xu et al. | |
| 5,500,668 A | 3/1996 | Malhotra et al. | |
| 5,519,072 A | 5/1996 | Wieczorek, Jr. et al. | |
| 5,523,344 A | 6/1996 | Maksymkiw et al. | |
| 5,527,655 A | 6/1996 | Bonham et al. | |
| 5,530,056 A | 6/1996 | Farwaha et al. | |
| 5,532,300 A | 7/1996 | Koubek et al. | |
| 5,537,137 A | 7/1996 | Held et al. | |
| 5,543,488 A | 8/1996 | Miller et al. | |
| 5,552,495 A | 9/1996 | Miller et al. | |
| 5,563,644 A | 10/1996 | Isganitis et al. | |
| 5,565,250 A | 10/1996 | Ohlsson et al. | |
| 5,601,023 A | 2/1997 | Hale et al. | |
| 5,611,882 A | 3/1997 | Riebel et al. | |
| 5,618,876 A | 4/1997 | Farwaha et al. | |
| 5,640,180 A | 6/1997 | Hale et al. | |
| 5,642,141 A | 6/1997 | Hale et al. | |
| 5,645,904 A | 7/1997 | Woo et al. | |
| 5,658,625 A | 8/1997 | Bradfute et al. | |
| 5,661,201 A | 8/1997 | Degrand | |
| 5,670,566 A | 9/1997 | Liedermooy et al. | |
| 5,717,015 A | 2/1998 | Dust et al. | |
| 5,719,224 A | 2/1998 | Agree et al. | |
| 5,719,244 A | 2/1998 | Farwaha et al. | |
| 5,732,633 A | 3/1998 | Herskowits | |
| 5,734,396 A | 3/1998 | Hale et al. | |
| 5,750,605 A | 5/1998 | Blumenthal et al. | |
| 5,764,263 A | 6/1998 | Lin | |
| 5,770,143 A | 6/1998 | Hawley et al. | |
| 5,814,138 A | 9/1998 | Fague | |
| 5,821,294 A | 10/1998 | Perlinski | |
| 5,830,263 A | 11/1998 | Hale et al. | |
| 5,837,766 A | 11/1998 | Metro et al. | |
| 5,840,146 A | 11/1998 | Woo et al. | |
| 5,844,217 A | 12/1998 | Hawley et al. | |
| 5,853,469 A | 12/1998 | Colt et al. | |
| 5,886,081 A | 3/1999 | Sternowski | |
| 5,936,008 A | 8/1999 | Jones et al. | |
| 5,969,003 A | 10/1999 | Foucher et al. | |
| 5,981,022 A | 11/1999 | Min et al. | |
| 6,231,985 B1 | 5/2001 | Chen et al. | |
| 6,244,441 B1 | 6/2001 | Ahlgren | |
| 6,264,791 B1 | 7/2001 | Sun et al. | |
| 6,282,274 B1 | 8/2001 | Jain et al. | |
| 6,303,166 B1 | 10/2001 | Kolbe et al. | |
| 6,326,419 B1 | 12/2001 | Smith | |
| 6,348,679 B1 | 2/2002 | Ryan et al. | |
| 6,365,650 B1 | 4/2002 | Chen et al. | |
| RE37,699 E | 5/2002 | Bradfute et al. | |
| 6,443,568 B1 | 9/2002 | Askeland et al. | |
| 6,451,912 B1 | 9/2002 | Kelch | |
| 6,617,490 B1 | 9/2003 | Chen et al. | |
| 6,617,557 B1 | 9/2003 | Ryan et al. | |
| 6,649,888 B2 | 11/2003 | Ryan et al. | |
| 6,692,603 B1 | 2/2004 | Lindsay et al. | |
| 6,773,101 B2 | 8/2004 | Tochihara et al. | |
| 6,783,623 B2 | 8/2004 | Morin et al. | |
| 6,812,445 B2 | 11/2004 | Gorbold | |
| 6,866,378 B2 | 3/2005 | Wotton et al. | |
| 7,073,901 B2 | 7/2006 | Mills et al. | |
| 7,520,600 B2 | 4/2009 | Gorbold et al. | |
| 2002/0044186 A1 | 4/2002 | Tochihara et al. | |
| 2002/0079121 A1* | 6/2002 | Ryan et al. | 174/68.1 |
| 2002/0101491 A1 | 8/2002 | Ervin et al. | |
| 2003/0034117 A1 | 2/2003 | Thomas et al. | |
| 2003/0035037 A1 | 2/2003 | Mills et al. | |
| 2003/0125449 A1 | 7/2003 | Chen et al. | |
| 2003/0128247 A1* | 7/2003 | Han-Adebekun et al. | 347/100 |
| 2003/0142187 A1 | 7/2003 | Elgee et al. | |
| 2003/0172840 A1 | 9/2003 | Blank et al. | |
| 2003/0202032 A1 | 10/2003 | Moffat et al. | |
| 2004/0017027 A1 | 1/2004 | Vora et al. | |
| 2004/0080593 A1 | 4/2004 | Wotton et al. | |
| 2004/0103985 A1 | 6/2004 | Morin et al. | |
| 2004/0151916 A1 | 8/2004 | Chen et al. | |
| 2005/0038729 A1 | 2/2005 | Hsu et al. | |
| 2005/0200676 A1 | 9/2005 | Kadomatsu et al. | |
| 2006/0049982 A1 | 3/2006 | Wells | |
| 2006/0050013 A1 | 3/2006 | Nason et al. | |
| 2006/0109327 A1 | 5/2006 | Diamond et al. | |

FOREIGN PATENT DOCUMENTS

| | | |
|---|---|---|
| CA | 2600416 | 5/2006 |
| EP | 0281396 | 6/1992 |
| EP | 0491564 | 6/1992 |
| EP | 0497501 | 8/1992 |
| EP | 0556968 | 8/1993 |
| EP | 0672538 | 9/1995 |
| EP | 0559324 | 10/1995 |
| EP | 0737583 | 10/1996 |
| EP | 1213332 | 6/2002 |
| EP | 1258551 | 11/2002 |
| EP | 1403092 | 3/2004 |
| EP | 1410911 | 4/2004 |
| EP | 1416022 | 6/2004 |
| EP | 1428668 | 6/2004 |
| EP | 1439063 | 7/2004 |
| GB | 1303303 | 1/1973 |
| JP | 59 224388 | 12/1984 |
| JP | 61 112665 | 5/1986 |
| JP | 61 163895 | 7/1986 |
| JP | 01 174490 | 7/1989 |
| JP | 02 233265 | 9/1990 |
| WO | WO 00/69629 | 11/2000 |
| WO | WO 02/064689 | 8/2002 |
| WO | WO 03/010250 | 2/2003 |
| WO | WO 2004/104087 | 12/2004 |
| WO | WO 2006/049982 | 5/2006 |
| WO | WO 2006/049987 | 5/2006 |
| WO | WO 2006/050013 | 5/2006 |

OTHER PUBLICATIONS

RadioFrequency Company web page, description of Macrowave Heating, 2 pgs., printed Feb. 1, 2006.

RadioFrequency Company web page, description of Macrowave Non Contact Dryer, 3 pgs., printed Feb. 1, 2006.
International Search Report and Written Opinion for PCT/US2005/038530 dated Aug. 2, 2006.

International Search Report and Written Opinion for PCT/US2005/038729 dated Jun. 13, 2006.

* cited by examiner $r_1$ = inner radius $r_2$ = outer radius

FAST-DRYING, RADIOFREQUENCY-ACTIVATABLE INKJET INKS AND METHODS AND SYSTEMS FOR THEIR USE

CROSS-REFERENCE TO RELATED APPLICATIONS

This application is a divisional application of U.S. patent application Ser. No. 11/260,779, filed Oct. 27, 2005, which in turn claims the benefit of U.S. Provisional Patent Application No. 60/522,721, filed Nov. 1, 2004, and U.S. Provisional Patent Application No. 60/680,256, filed May 12, 2005, the entire disclosures of which are incorporated herein by reference for any and all purposes.

FIELD OF THE INVENTION

The present invention provides methods of drying radiofrequency-activatable inkjet inks, methods for customizing the radiofrequency (RF) parameters of an RF source based on pre-selected printing conditions, and methods for selecting or formulating an RF inkjet ink composition based on pre-selected printing conditions and/or printing equipment. The invention further provides radiofrequency-activatable inks having customized radiofrequency susceptibility profiles and to sets of such radiofrequency-activatable inks.

BACKGROUND OF THE INVENTION

Most inkjet inks currently available are low viscosity liquids which contain large amounts of water, often 90 weight percent or greater. The use of water as a solvent in these inks is advantageous because it is inexpensive, environmentally friendly and non-toxic. Unfortunately, water also has a relatively high boiling point and a high latent heat of evaporation. For this reason, inkjet inks which contain large amounts of water tend to be slow-drying. Slow-drying inks are disfavored for many printing applications because they lead to slow printing rates.

To speed up the printing rate of water-based inkjet inks, printing equipment may employ external heating devices to speed up the evaporation of water from the inks. Unfortunately, external heating involves heating equipment which is often expensive and impractical. Another approach to increasing the drying rate of water-based inkjet inks is to generate heat internally within the inks by incorporating radiation susceptors into the ink formulations. These susceptors are activated by exposing them to radiation of a suitable frequency, causing them to generate heat within the ink and speeding up the evaporation of water and other volatile solvents. Most of these susceptors are microwave activated inorganic salts. Unfortunately, the use of microwave energy poses human safety hazards in an inkjet printing device and also results in slow heating of the inks.

Inkjet ink formulations that optimize the transfer of radiation to an inkjet ink frequently do not provide inkjet inks with optimal printing properties. This problem is exacerbated by the standard practice in the printing industry of formulating and selling microwave activatable inkjet inks that are not tailored to specific printing applications or printing equipment and is further exacerbated by the standard practice of using microware sources that are insufficiently adjustable to allow their microwave parameters to be tailored based on the susceptibility characteristics of a selected inkjet ink.

Thus, a need exists for methods which provide improved drying times for inkjet inks while minimizing human safety hazards. In addition, a need exists for methods of providing a system for customizing inkjet inks based on pre-selected printing applications and printing equipment and a system for customizing a radiation source for use with a pre-selected radiation-activatable inkjet ink in a pre-selected printing application.

SUMMARY

The present invention provides fast-drying radiofrequency-activatable RF inkjet ink compositions. The RF inkjet ink compositions include one or more radiofrequency susceptors, a colorant and a polar carrier. The polar carrier is generally characterized as being polar and having a high dielectric constant such that ions readily dissociate in its presence. It is believed that the radiofrequency susceptors in the ink compositions generate heat when exposed to radiofrequency energies from ionic conduction caused by the movement of dissociated ions in the polar carrier. This internally-generated heat enhances evaporation of volatile liquids from the ink compositions and results in shorter drying times compared to normal evaporation, wetting and spreading of ink or by other means such as forced air drying, infrared or microwave heating. In some instances, the inkjet compositions provided herein, may be dried at a rate fast enough to allow for a printing speed of one page per second, or even faster, without any smearing of the inks.

One type of RF susceptors that may be used in the RF inkjet ink compositions are RF-activatable ionomers. Suitable ionomers include, but are not limited to, acrylic acid polymers and copolymers, maleic anhydride polymers and copolymers, sulfonated polyesters, sulfonated polystyrenes and salts thereof. These and other suitable ionomers are described in detail in U.S. Pat. No. 6,348,679, the entire disclosure of which is incorporated herein by reference. Typically the ionomers will be present in amounts of about 0.1 to 35 weight percent (wt. %) based on the total weight of the inkjet ink composition.

The colorants used in the RF inkjet ink compositions may be pigments, dyes or a mixtures thereof. Examples of dyes that may be used in the RF inkjet ink compositions include, but are not limited to, acid dyes, basic dyes, direct dyes, reactive dyes and anionic and cationic dyes. Examples of pigments that may be used in the RF inkjet ink compositions include, but are not limited to, titanium dioxide pigments, iron oxide pigments, carbon black and organic pigments. In some embodiments the susceptor is an ionomer which is chemically grafted to the pigments. The pigments desirably have particle sizes that are sufficiently small to avoid clogging inkjet printer nozzles. Clogging of the nozzles may generally be avoided by employing pigments having an average particle diameter of no more than about 5 microns, and, preferably, no more than about 1 micron. The amount of colorant present in the RF inkjet ink compositions will depend on the desired color and intensity of the final ink product. However, in some illustrative embodiments, colorants may be present in an amount of about 1 to 10 wt. % based on the total weight of the inkjet ink composition.

The polar carrier is present in the RF inkjet ink compositions to dissolve or disperse RF susceptors, such as ionomers, and colorants and to provide a composition having a viscosity suitable for use in inkjet printing applications. The polar carrier may be water or a mixture of water and a water-miscible organic polar carrier. Glycerol is one example of an organic polar carrier suitable for use in the inks. In some embodiments water will account for about 40 to 90 wt. % of the ink compositions while the organic polar carrier will account for about 0.1 to 40 wt. % of the inkjet ink compositions.

The RF inkjet ink compositions may optionally include one or more polymeric binders. These binders help to increase the viscosity and stability of the RF inkjet ink compositions, making them suitable for inkjet printing applications, and help affix the colorant to the substrate once the inks have been printed and dried. Examples of suitable polymeric binders include water-soluble polymers such as gums (e.g., gum Arabic), poly(meth)acrylates and their salts, celluloses and polyvinyl alcohols.

Substrates onto which the RF inkjet ink compositions may be printed include, but are not limited to, paper substrates, polymeric (e.g., plastic or rubber) substrates, metallic substrates, fabric substrates and wood substrates. Suitable paper substrates include, but are not limited to photographic paper, copier paper, drawing paper, and printer paper. Suitable plastic substrates include transparencies. In some embodiments of the present invention, the substrate includes water-soluble RF susceptors (e.g., RF-activatable ionomers) that dissolve into an aqueous inkjet ink applied to the substrate. These substrates may convert an inkjet ink that was RF-inactivatable or insufficiently RF-activatable into an improved RF-activatable ink in situ, that is, during the printing process.

Methods for printing with the fast-drying radiofrequency-activatable RF inkjet ink compositions are also provided. These methods involve printing the radiofrequency-activatable RF inkjet ink compositions on a substrate and exposing the radiofrequency-activatable ink compositions to radiofrequency energies having wavelengths suitable to activate the RF susceptors.

Because the appropriate RF characteristics of a given inkjet ink will depend, at least in part, on the radiofrequency parameters of the radiofrequency source and/or on the specific printing parameters (e.g., substrate type, printing speed, inkjet droplet volume, etc.) the RF inkjet ink composition may be formulated with a variety of radiofrequency susceptibility characteristics that are customized for use with preselected printing conditions (e.g., preselected printing equipment and or printing substrates) and/or RF sources. One measure of an inkjet ink's susceptibility is the dielectric loss (e") measured as a function of the frequency of the RF radiation being applied in the inkjet ink. For the purposes of this invention, the susceptibility properties (e.g., dielectric loss properties) of an inkjet ink at a particular frequency, or as a function of frequency, will be referred to as the ink's susceptibility profile.

In order to accommodate a wide range of printing parameters and printing/RF equipment, the RF-activatable inks may be formulated to have a wide range of dielectric loss values at selected frequencies. For example, in some embodiments the inkjet inks will have dielectric loss (e") values of about 1000 to about 20,000 at a frequency of 30 MHz. This includes embodiments wherein the inkjet inks have e" values of about 1000 to about 5000 (e.g., about 1500 to about 3000), further includes inkjet inks that have e" values of about 5000 to about 10,000 (e.g., about 6000 to about 8000) and still further includes inkjet inks that have e" values of about 10,000 to about 20,000 (e.g., about 12,000 to about 18,000), measured at a frequency of 30 MHz. In some embodiments the inkjet inks will have e" values of about 200 to about 5000 at 60 MHz. This includes inkjet inks that have e" values of about 200 to about 1000 (e.g., about 300 to 500), further includes inkjet inks that have e" values of about 1000 to about 3000 (e.g., about 1500 to 2500), and still further includes inkjet inks that have e" values of about 3000 to about 5000 (e.g., about 3500 to about 4500), measured at a frequency of 60 MHz. It should be understood, however, that the RF-activatable inks provided herein are not limited to those having these particular RF-susceptibility profiles.

A desired susceptibility profile for an RF inkjet ink composition may be achieved by including an effective amount of RF susceptor in the initial ink formulation. Alternatively, a desired susceptibility profile may be achieved by taking a first inkjet ink (e.g., a commercially available and/or pre-existing inkjet ink) having a first susceptibility profile and adjusting the RF susceptor content in the first inkjet ink by an effective amount to provide a second inkjet ink having a second susceptibility profile. The adjustment may be accomplished, for example, by adding more RF susceptor or by diluting or inactivating RF susceptor present in the first inkjet ink. For the purposes of this disclosure, an "effective amount" of RF susceptor refers to an amount that is sufficient to provide a final inkjet ink with RF susceptibility properties that make it compatible with a preselected printing apparatus, RF source and/or printing substrate such that printing and RF activation of the inkjet inks provides printed media with target properties.

The RF inkjet ink composition may be provided to an end user as separate inks or may be provided as a set of inks. For example a set of inks may be provided to the end user in the form of an ink cartridge in which different colored inks are housed in different wells within the cartridge. Because, in a typical application, the inks in the set will all be applied using the same printing apparatus and RF source, it is desirable to provide a set of inks that each have the same susceptibility properties at an RF frequency at which the printing apparatus is designed to operate. Thus, one aspect of the invention provides a set of inkjet inks, wherein each ink in the set is formulated to have the same, or substantially the same, dielectric loss value at a given radiofrequency. In the present context, the phrase "substantially the same" is used in acknowledgment of the fact that it is not always practical to match e" values exactly and therefore, there may be some small variation in the e" of the inks in the inkjet ink sets. This variation is desirably no more than about 10%, more desirably no more than about 5% and still more desirably no more than about 2%.

Another aspect of the invention provides systems for customizing the RF parameters for a RF source associated with an inkjet printing apparatus in order to achieve improved print quality and/or ink drying efficiency. The system is capable of receiving an RF susceptibility profile for an RF inkjet ink composition and further receiving at least one ink application parameter for a printing apparatus. The system then selects at least one RF parameter for the RF source based on (e.g., calculated from) the received RF susceptibility profile and ink application parameter.

Yet another aspect of the invention provides systems for customizing RF inkjet ink composition selection in order to achieve improved print quality and/or drying efficiency. The system is capable of receiving at least one RF parameter for an RF source that is associated with an inkjet printer and further receiving at least one ink application parameter for a printing apparatus. The system then selects, formulates, or provides instructions for the formulation of, an RF inkjet ink composition having an appropriate susceptibility profile, based on (e.g., calculated from) the at least one RF parameter and the at least one ink application parameter.

Further objects, features and advantages of the invention will be apparent from the following description when taken in conjunction with the accompanying drawings.

DETAILED DESCRIPTION

Definitions of Terms

Figure 1:
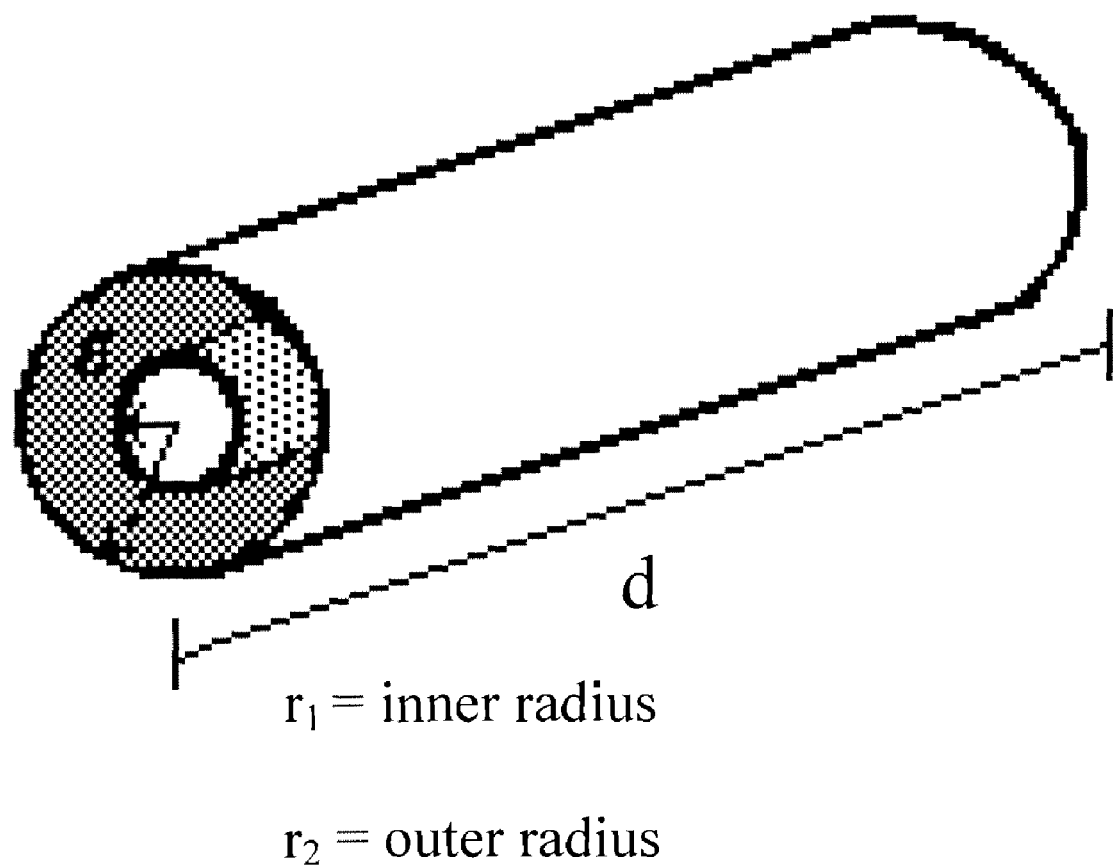
FIG. 1 is a representation of a K&D cell.

"RF Susceptors" means either ionic or polar compounds introduced as a component into a composition such that RF heating of the resulting RF inkjet ink composition occurs when the composition is exposed to RF radiation.

"Polar Carrier" provides a mobile medium in which RF susceptors are dissolved, distributed, or disbursed. Polar carriers can be liquids such as solvents, plasticizers, and humectants. These can be organic or aqueous type.

"RF Inkjet Ink Composition" comprises at least one RF susceptor, at least one polar carrier and at least one colorant. The RF inkjet ink composition may also include binders, surfactants, wetting agents, de-foamers, humectants, buffers, chelating agents, solubilizers and biocides sufficient for the performance of the inkjet ink.

One aspect of this invention relates to fast-drying radiofrequency-activatable RF inkjet ink compositions. The RF inkjet ink compositions include at least one RF susceptor and at least one polar carrier which may be activated by radiofrequency energy to generate heat within the RF inkjet ink compositions, resulting in enhanced evaporative drying. The inkjet inks also include at least one colorant. In some embodiments, the colorant may also function as an RF susceptor.

The RF inkjet ink compositions are formulated with sufficient levels of RF susceptors and polar carrier to achieve sufficient RF energy absorption rates to meet inkjet print speed drying requirements. The maximum printing speed achievable by a given RF inkjet ink composition will depend on the amount of radiofrequency energy converted to heat. This is a function of the susceptibility of the inkjet inks to the radiofrequency field as well as the RF field energy density, the RF field size, the exposure time to the RF field as well as the efficiency of the RF electrical circuit impedence matching. The RF susceptibility of the inkjet ink is dependant on the type and concentration of the RF susceptor and the polar carrier. The RF field density provides the source of energy to be converted into heat within the RF inkjet ink composition and is dependant on the geometry of the RF electrodes as well as the RF voltage being applied to the RF electrodes to create the RF field. The RF voltage applied to the RF electrode under normal ambient operating conditions is limited to a maximum of about 6 kilovolts per centimeter. Both the RF field size and the RF field exposure time is dependant on the physical geometry of the RF electrodes and the printing speed. The efficiency of the RF electrical circuit impedance matching is controlled by the design of the electrical components that comprise the impedance matching circuit. By selecting the correct electrical components for the impedance matching circuit, the RF electrode impedance will be correctly converted and matched to the impedance of the RF power source that commonly has an impedance of 50 ohms but may also be of another impedance. All of the elements listed above contribute to the complete energy transfer efficiency from the RF energy source to the RF electrode probe to the RF field generated to the energy absorbed by the RF inkjet ink composition to the heat generated within the RF inkjet ink composition which results in a drying rate improvement. The amount of RF susceptor in the RF inkjet ink compositions may also affect the viscosity of the compositions.

In some embodiments, the RF inkjet ink compositions contain substantial amounts of radiofrequency-activatable ionomers as RF susceptors. For example, the RF inkjet ink compositions may include about 0.1 to 10 wt. % solid ionomer, based on the total weight of the inkjet ink composition. This includes embodiments where the inks contain about 0.5 to 3 wt. % ionomer, based on the total weight of the inkjet ink composition. In some embodiments the ionomer content in the inkjet ink composition, based on the total weight of the composition, is about 1 to 10 wt. %, including compositions where the ionomer content in the inkjet ink composition is about 2 to 6 wt. %.

A variety of radiofrequency-activatable ionomers may be used in the RF inkjet ink compositions. Examples of such ionomers are described in detail in U.S. Pat. No. 6,348,679. One specific class of ionomers that may be used in the RF inkjet ink compositions is acrylic acid polymers and copolymers. The copolymers are polymerized from at least one of an acrylic acid or methacrylic acid monomer and at least one additional monomer such as a vinyl aromatic monomer (e.g., styrene) or ethylene. Specific examples of such copolymers include, but are not limited to, styrene-acrylic copolymers and salts thereof, ethylene-acrylic copolymers and salts thereof and vinylacetate-acrylic copolymers and salts thereof. The acrylic acid copolymers may be made using well-known polymerization techniques, including batch, continuous and semi-continuous polymerizations. In addition, suitable acrylic polymer are commercially available. One example of a commercially available styrene-acrylic copolymer is JONCRYL™ 682, available from Johnson Polymer, Sturtevant, Wis. From these polymers and copolymers, ionomers may be obtained by neutralization with a suitable base. In some embodiments acrylic acid polymers or copolymers have acid numbers in the range 35 to 350 mg of KOH/g and weight-average molecular weight in the range 1500 to 50,000. Suitable bases include, but are not limited to, KOH, LiOH, NaOH, $Mg(OH)_2$, $Ca(OH)_2$ and amines, including ammonia.

Other suitable acrylic acid polymers and copolymers and salts thereof are described in U.S. Pat. Nos. 5,821,294; 5,717,015; 5,719,244; 5,670,566; 5,618,876; 5,532,300; 5,530,056; 5,519,072; 5,371,133; 5,319,020; 5,037,700; 4,713,263; 4,696,951; 4,692,366; 4,617,343; 4,948,822; and 4,278,578; the entire disclosures of which are incorporated herein by reference. Examples of commercially available acrylic acid copolymers include ethylene acrylic acid copolymer and the ammonium (MICHEM™ 4983P) and sodium (MICHEM™ 48525R) salts thereof available from Michelman Incorporated, Cincinnati, Ohio. Additional examples are vinyl acetate acrylic copolymers (e.g. ROVACE™ HP3442) available from Rohm and Hass Company, Philadelphia, Pa.

Maleic anhydride polymers, copolymers and salts thereof are another class of ionomer that may be used in the RF inkjet ink compositions. Specific examples of suitable maleic anhydride-based copolymers include, but are not limited to, styrene maleic anhydride, ethylene maleic anhydride and propylene maleic anhydride copolymers.

Sulfonated polymers are another class of ionomers that may be used in the RF inkjet ink compositions. This class includes sulfonated polyesters, copolymers and salts thereof. Also included in this group are sulfonated polystyrenes, acrylamidopropane sulfonate based polymers and urethane ionomers polymerized from a diisocyanate diol with a sulfonate functionality. More information, including specific examples of each of the above-referenced types of ionomers, may be found in U.S. Pat. No. 6,348,679, the entire disclosure of which is incorporated herein by reference. Suitable sulfonated polyesters and copolymers thereof are also described in U.S. Pat. Nos. 5,750,605; 5,552,495; 5,543,488; 5,527,655; 5,523,344; 5,281,630; 4,598,142; 4,037,777; 3,033,827; 3,033,826; 3,033,822; 3,075,952; 2,901,466; 2,465,319; 5,098,962; 4,990,593; 4,973,656; 4,910,292; 4,525,524; 4,408,532; 4,304,900; 4,257,928; 4,233,196; 4,110,284;

4,052,368; 3,879,450; and 3,018,272; the entire disclosures of which are incorporated herein by reference. Some sulfonated polyesters may be purchased commercially. Commercially available sulfonated polyesters are sold by Eastman Chemical Company, Kingsport, Tenn., under nos. AQ1045, AQ1350, AQ1950, AQ14000, AQ35S, AQ38S, AQ55S and EASTEK™ 1300.

Cationic polymers, such as those made from monomers comprising N,N-dimethylaminoethyl (meth)acrylate and the hydrogen chloride and methyl chloride salts thereof may also be used as ionomers in the present RF inkjet ink compositions for some inks with cationic compatible formulations.

In addition to (or instead of) the ionomers, other radiofrequency-activatable compounds, such as non-polymeric inorganic metal salts, may be included in the compositions. However, for some applications it may be desirable to provide RF inkjet ink compositions that are free of or substantially free of (e.g., contain no more than about 0.05, or even no more than about 0.01 wt. %) inorganic metal salts. The absence of inorganic metal salts is advantageous because these salts may contribute to paper curl and may negatively impact the latency of the inks.

The liquid carrier present in the RF inkjet ink compositions dissolves or disperses the susceptor and the colorant and desirably also serves to enhance the radiofrequency activation of the susceptor. Thus, preferred embodiments of the RF inkjet ink compositions will include a polar carrier composed of water and optionally, at least one water-miscible organic polar carrier capable of reducing the radiofrequency drying time of the compositions. The amount of polar organic carrier and water present in the compositions will depend, at least in part, on the desired RF susceptibility and viscosity of the ink formulations. As discussed above, the RF susceptibility of the formulation should be sufficient to allow for fast radiofrequency drying without arcing, while the viscosity of the formulation should be low enough to provide an ink formulation that is compatible with inkjet printing applications. In some embodiments, the RF inkjet ink compositions will contain about 0.1 to 40 wt. % organic polar carrier. This includes embodiments where the RF inkjet ink compositions include about 1 to 30 wt. % organic polar carrier and further includes embodiments where the RF inkjet ink compositions include about 5 to 20 wt. % organic polar carrier. In some embodiments, the RF inkjet ink compositions may contain about 40 to 95 wt. % water. This includes embodiments where the RF inkjet ink compositions include about 60 to 90 wt. % water and further includes embodiments where the RF inkjet ink compositions include about 65 to 80 wt. % water.

Solvents (including some which are polar organic carriers) that may be present in the liquid carrier include, but are not limited to, ethylene glycol, propylene glycol, butylene glycol, diethylene glycol, polyalkylene glycols, glycerol, polyvinyl alcohol, amides, ethers, carboxylic acids, esters, alcohols, organosulfides, organosulfoxides, sulfones, alcohol derivatives, ether derivatives, amino alcohols, ketones, water soluble acrylic copolymers containing hydroxyl groups and mixtures thereof. In some cases, the solvents act as humectants for the ink.

The organic polar carriers used in the RF inkjet ink compositions are desirably high boiling point solvents with high dielectric constants. For example, the organic polar carriers may have a dielectric constant of at least about 10 or even at least about 20 at 20° C. Because they have high boiling points, the organic polar carriers do not evaporate to a significant extent during ink jetting or drying. This allows for continuous radiofrequency susceptibility as the water in the ink is heated and evaporated. Specific examples of suitable polar organic carriers are listed in U.S. Pat. No. 6,348,679, the entire disclosure of which is incorporated herein by reference. Glycerol and polyethylene glycol are two examples of preferred organic polar carrier. When glycerol is present as a polar organic carrier, it may be present in an amount of about 1 to 20 wt. %, based on the total weight of the inkjet ink composition. This includes embodiments where glycerol is present in an amount of about 1 to 10 wt. % and further includes embodiments where the glycerol is present in an amount of about 1 to 5 wt. %, based on the total weight of the inkjet ink composition. In some embodiments organic polar carrier comprises formamide or N,N-dimethylformamide.

The colorants used in the RF inkjet ink compositions may be pigments, dyes or a combination of one or more pigments and/or dyes. Suitable colorants include, but are not limited to, cyan, yellow, magenta and black colorants. The amount of pigment or dye in a given inkjet ink formulation will depend on the desired color and intensity of the ink. However, in some illustrative embodiments the RF inkjet ink compositions will contain about 0.1 to 10 wt. % colorant based on the total weight of the ink composition. This includes embodiments where the RF inkjet ink compositions include about 1 to 8 wt. % and further includes embodiments where the RF inkjet ink compositions include about 2 to 6 wt. % colorant based on the total weight of the RF inkjet ink compositions. Examples of suitable pigments and dyes for use in the present ink formulations may be found in U.S. Pat. No. 6,866,378, and in U.S. Pat. No. 5,814,138, the entire disclosures of which are incorporated herein by reference. Some non-limiting examples of dyes that may be used in the present RF inkjet ink compositions include anthraquinones, monoazo dyes, disazo dyes, phthalocyanines, aza[18]annulenes, formazan copper complexes, triphenodioxazines, Bernacid Red 2BMN; Pontamine Brilliant Bond Blue A; Pontamine; Food Black 2; Direct Blue 199; Direct Blue 86; Reactive Red 4; Acid Red 92; Cartasol Yellow GTF Presscake, available from Sandoz, Inc.; Acid Yellow 23; Basacid Black X34, available from BASF, Carta Black 2GT, available from Sandoz, Inc.; Direct Brilliant Pink B (Crompton-Knolls); Levaderm Lemon Yellow (Mobay Chemical Company); Spirit Fast Yellow 3G; -Sirius Supra Yellow GD 167; Pyrazol Black BG (ICI); Morfast Black Conc A (Morton-Thiokol); Diazol Black RN Quad (ICI); Direct Yellow 86; Acid Red 249); Direct Black 168; Direct Yellow 132; Aminyl Brilliant Red F-B, available from Sumitomo Chemical Co. (Japan) and mixtures thereof. Some non-limiting examples of pigments that may be used in the compositions include titanium dioxide, iron oxide, carbon black, copper tetra-4-(octadecyl sulfonamido) phthalocyanine, X-copper phthalocyanine pigment, CI Pigment Blue, Anthradanthrene Blue, Special Blue X-2137, diarylide yellow 3,3-dichlorobenzidene acetoacetanilides, CI Solvent Yellow 16, CI Dispersed Yellow 33, 2,5-dimethoxy-4-sulfonanilide phenylazo-4'-chloro-2,5-dimethoxy aceto-acetanilide, and Permanent Yellow FGL.

Optionally, a polymeric binder may be added to the RF inkjet ink compositions. These polymeric binders act as viscosity control agents and help to affix colorant to a substrate after the ink has been printed and dried. However, it should be recognized that in some cases the RF susceptors themselves provide an adequate binder, eliminating the need for additional polymeric binder. Where a polymeric binder is present, the amount of polymeric binder added should be sufficient to provide an inkjet ink composition having a viscosity suitable for inkjet printing applications. For example, some RF inkjet ink compositions in accordance with the present invention will contain about 0.1 to 20 wt. % polymeric binder. This includes embodiments where the RF inkjet ink compositions contain about 1 to 10 wt. % polymeric binder. Suitable polymeric binders are listed in U.S. Pat. No. 6,866,378. These polymeric binders include water soluble polymers such as gum Arabic, polyacrylate salts, polymethacrylate salts, polyvinyl alcohols, hydroxypropylcellulose, hydroxyethylcellulose, polyvinylpyrrolidinone, polyvinylether, starch, polysaccharides and polyethyleneeimines derivatized with polyethylene oxide and polypropylene oxide, water-soluble acrylic resins and emulsion polymers. In some cases binders may contain surfactants which may also act as RF susceptors.

Other additives that may be found in RF inkjet ink compositions include, but are not limited to, surfactants, wetting agents, defoamers, humectants, buffers, chelating agents, solubilizers and biocides. These additives may be present in amounts of about 0.1 to 15 wt. % (e.g., about 0.5 to 10 wt. %), based on the total weight of the ink composition. More specifically, a typical ink composition might contain about 0.1 to 10 wt. % surfactant, about 0.05 to I wt. % biocide, about 0.1 to 0.5 wt. % buffer and/or about 0.01 to 1 wt. % other additives, such as chelating agents, defoamers and solubilizers.

The inkjet inks are generally characterized by high ionic conductivities and radiofrequency energy susceptibilities. Ionic conductivity is not the same as electric conductivity as highly ionic conductive materials may be substantially electrical insulators. One measure of radiofrequency susceptibility is the dielectric loss factor (e") otherwise known in the art as the imaginary portion of the relative permittivity. In contrast, the real portion of the relative permittivity of a material is known as the dielectric constant. For some of the inkjet inks provided herein the dielectric loss factor is at least about 15. This includes embodiments where the dielectric loss factor at a frequency of 30 MHz is at least about 15, further includes embodiments where the dielectric loss factor at a frequency of 30 MHz is at least about 100, still further includes embodiments where the dielectric loss factor at a frequency of 30 MHz is at least about 1000, even further includes embodiments where the dielectric loss factor at a frequency of 30 MHz is at least about 10,000.

In other embodiments, ions required for promoting ionic conduction in the radio frequency field are additionally provided by the substrate itself. The act of printing the ink onto the substrate causes these ions to dissociate in the water and polar solvent, thus providing sufficient ionic character for ionic conduction.

In some cases, the colorant itself may be active in the RF field. For example, some carbon black pigments are electrically active as a result of their structure. Without appropriate modification, inks containing these materials can be a problem unless the RF susceptibility is controlled so as to prevent arcing in the field.

The inkjet inks may be formulated such that they have viscosities and surface tensions that are appropriate for inkjet printing applications. Viscosities of about 1 to 25 cp at 25° C. and surface tensions of about 30 to 60 dynes/cm at 25° C. are typically suitable for inkjet printing. However, the present compositions are not limited to those having viscosities and surface tensions that fall within these ranges.

Radiofrequency drying of the inks may be accomplished by printing the inks onto a substrate and exposing the printed inks to radiofrequency energies suitable for ionic conduction. As used herein, the term "radiofrequency" may include any frequencies that fall within the radiofrequency range of the electromagnetic spectrum. In some embodiments the ionomers are activatable at frequencies of about 100 kHz to 1.0 GHz. In some embodiments it is advantageous to use ionomers that are activatable at frequencies of less than about 1 GHz or even less than about 0.5 GHz, that is, at frequencies lower than microwave frequencies (i.e., about 1 GHz to 300 GHz). One standard preferred frequency is 27.12 MHz which is an international industrial, scientific and medical band. Other standard frequencies exist as well and may be preferred but not required for this invention. Without wishing or intending to be bound to any particular theory of the invention, the inventors believe radiofrequency wavelengths below the microwave frequency range may be superior because at these frequencies, the heat generated due to ionic conductivity is much more significant than at the higher microwave frequencies where dipole rotation dominates as a source of heat. Otherwise stated, at radiofrequencies below microwave frequencies ionic conductivity dominate the loss mechanism whereas at microwave frequencies the relaxation process (i.e., the reorientation of permanent dipoles) is more important. Equipment that may be used to expose the printed inks to the appropriate radiofrequency energies is known and commercially available. Suitable equipment is described in U.S. Pat. No. 6,348,679.

The radiofrequency field to which the inks are exposed are generated from RF power sources in the range from about 1 to 1000 W for home and office printers. However, a higher power may be desirable for industrial printing devices. Thus, in some embodiments the ink compositions are exposed to radiofrequency fields with a power of about 50 to 5000 W. This includes embodiments where the ink compositions are exposed to radiofrequency fields with a power of about 50 to 4000 W.

The time of exposure to the radiofrequency field may vary. Desirably the time of exposure is sufficient to provide rapid radiofrequency drying and, subsequently, fast printing speeds. In some embodiments of the present methods the exposure time will be no more than about 1 second. This includes embodiments where the exposure time is no more than about 0.5 seconds, further includes embodiments where the exposure time is no more than about 2 milliseconds, still further includes embodiments where the exposure time is no more than about 200 milliseconds, and yet further includes embodiments where the exposure time is no more than about 50 milliseconds. For example, in one illustrative embodiment, the exposure time is about 50 to 250 milliseconds.

The rate at which a given inkjet ink composition dries will depend on a variety of factors including the concentration and nature of the RF susceptor and liquid carrier, the composition, frequency and intensity of the radiofrequency energy, the level of colorant in the ink, and the nature of the substrate. Generally inks dry to the touch faster on a porous substrate such as paper and dry very slowly on a non porous material such as a polymer film. Generally, the ink compositions may be considered "dry" when they are dry to the touch (i.e., without smearing) or when the ink is dry enough that successive layers of dots of ink do not bleed into each other and cause distortion of the print quality. Drying rates may be measured in terms of the rate of evaporation of volatile components from the printed inks upon exposure to radiofrequency energies. In some embodiments, the inkjet inks provided herein are characterized in that at least 50 wt. % of the liquid content of the inks may be removed after exposure to radiofrequency energies for about 1 second or less. This includes embodiments where at least 50 wt. % of the liquid content of the inks may be removed after exposure to radiofrequency energies for about 0.5 seconds or less, further includes embodiments where at least 50 wt. % of the liquid content of the inks may be removed after exposure to radiofrequency energies for about 100 milliseconds or less and still further includes embodiments where at least 50 wt. % of the liquid content of the inks may be removed after exposure to radiofrequency energies for about 50 milliseconds or less.

The inkjet inks are well-suited for use in a variety of inkjet printing technologies. These include both continuous and drop-on-demand applications, using a variety of inkjet printer types, including piezoelectric and thermal inkjet printers and any other type of inkjet printers.

Substrates onto which the inkjet inks may be printed include, but are not limited to, paper, film, coated and non coated materials, polymer, web-based substrates and textiles, including non-woven substrates.

Another aspect of the invention provides systems for customizing the RF parameters for a RF source associated with an inkjet printing apparatus in order to achieve improved print quality and/or ink drying efficiency. This system represents a novel approach to designing a printing protocol that provides flexibility and guidance in the selection of RF parameters and thereby enables a user to tailor a printing process to their needs and priorities. In RF-based printing applications, flexibility in the selection of RF parameters is desirable because optimal, or at least desirable, printing conditions depend on a number of variables. These variables include the susceptibility profile of the available RF inkjet ink compositions and the ink application capabilities of the available equipment. For example, different printers tend to have different ink application parameters, some of which are adjustable and some of which are not. As used herein, the phrase "ink application parameters" is intended to refer to any printing parameters that influence the possible printing speeds and/or print quality that may be achieved by a given inkjet printing apparatus. Examples of ink application parameters include, but are not limited to, printing speed, volumetric rate of ink droplet discharge, and substrate type. Typically, the desirable RF parameters for a given system will be RF parameters (e.g., RF frequency, RF power, size of RF field, exposure time and impedance match) that maximize energy transfer to the inkjet inks, thereby increasing the rate of drying, without sacrificing print quality or causing equipment malfunction (e.g., arcing).

To achieve the desired flexibility in selecting the RF parameters, the system is capable of receiving an RF susceptibility profile for an RF inkjet ink composition and further receiving at least one ink application parameter for a printing apparatus. The system then selects at least one RF parameter for the RF source, wherein the selection is based on (e.g., calculated from) the received RF susceptibility profile and ink application parameter. The system desirably selects both a RF power and RF frequency.

The system may be a manual or an automated system. For example, the system may be embodied in a hard copy of a database, such as graph, table or a spreadsheet, wherein the system "receives" an RF susceptibility profile via the act of a user looking up or locating a particular inkjet ink in the graph, table or spreadsheet. Similarly, the system "receives" at least one ink application parameter via the act of a user looking up or locating the at least one ink application parameter on the graph, table or spreadsheet. The system then "selects" one or more RF parameters via the user reading out or locating the RF parameters that correspond to the inkjet ink and the at least one ink application parameter, from the graph, table or spreadsheet.

The system may be a computerized system wherein instructions for carrying out the receiving and selecting steps are stored in a memory device. In one embodiment the computerized system would include a user interface that allows a user to input an inkjet ink selection (or a selected susceptibility parameter, e.g., a e" value), a printer type/model (or a specific ink application parameter) and/or an RF source type/model and the system would output at least one RF parameter that corresponds to the inputs. The output may be selected or calculated with reference to a database of inkjet inks, printer types/models and RF source types/models that is stored in the computer system. In some embodiments, the computerized system is contained within an inkjet printer or an RF source that is associated with an inkjet printer, such that the selection step is done automatically by the system. In this embodiment the system is able to control the RF source and set the RF parameters.

Yet another aspect of the invention provides systems for customizing RF inkjet ink composition selection in order to achieve improved print quality and/or drying efficiency. This system represents a novel approach to designing a printing protocol that provides flexibility and guidance in the selection or formulation of appropriate inkjet inks and thereby enables a user to tailor a printing process to the available printing and RF source equipment. In RF-based printing applications, guidance in the selection or formulation of appropriate inkjet inks is desirable because optimal, or at least desirable, printing conditions depend on a number of variables. These variables include the susceptibility profile of the available RF inkjet ink compositions and the ink application capabilities of the available printers.

In order to provide flexibility and guidance in selecting appropriate inkjet inks, the system is capable of receiving at least one RF parameter for an RF source that is associated with an inkjet printer and further receiving at least one ink application parameter for a printing apparatus. The system then selects, formulates, or provides instructions for the formulation of, an RF inkjet ink compositions having an appropriate susceptibility profile, based on (e.g., calculated from) the at least one RF parameter and the at least one ink application parameter.

The system may be a manual or an automated system. For example, the system may be embodied in a hard copy of a database, such as graph, table or a spreadsheet, wherein the system "receives" an RF parameter via the act of a user looking up or locating a particular RF source type/model (or RF parameter) in the graph, table or spreadsheet. Similarly, the system "receives" at least one ink application parameter via the act of a user looking up or locating a printer type/model (or a specific ink application parameter) on the graph, table or spreadsheet. The system then "selects" an inkjet ink (or a susceptibility profile for an inkjet ink) via the user reading out or locating the inkjet ink (or susceptibility profile) that correspond to RF source (or RF parameter) and the printer type/model (or application parameter), from the graph, table or spreadsheet.

The system may be a computerized system wherein instructions for carrying out the receiving and selecting (or instructing) steps are stored in a memory device. In one embodiment the computerized system would include a user interface that allows a user to input an RF source type/model (or a selected RF parameter, e.g., an RF frequency and/or RF power), a printer type/model (or a specific ink application parameter) and the system would output at least one recommended inkjet ink or a proposed inkjet ink formulation that corresponds to the inputs. The output may be selected or calculated with reference to a database of printer types/models and RF source types/models that is stored in the computer system. In some embodiments, the computerized system is contained within an inkjet printer that is capable of storing more than one inkjet ink, such that the selection step is done automatically by the system. In this embodiment the system is able to control the printer's selection of one of the inks available in the printer. Using this approach an inkjet ink manufacturer, distributor or seller could develop a business model wherein inks were "matched" to a particular printer and/or RF source and/or substrate based on the susceptibility profile (e.g., e" values) of the inks. For example, the packaging of the inks could indicate to a user or purchaser which printers, printer settings (e.g., print speed), RF sources (or RF parameters) and/or substrates are compatible or recommended for the ink, wherein this indication or recommendation is based (at least partially or even primarily) on the RF susceptibility profile of the inkjet ink.

Some embodiments of the present system combine both approaches outlined above. In these embodiments the system is able to select appropriate RF parameters and appropriate inkjet inks based on received information regarding ink application parameters, the susceptibility profiles of the available inks and the RF characteristics/capabilities of the available RF sources.

As the examples above illustrate, the information received by the present systems may be received directly, as in the case where the information received or input is a susceptibility parameter or profile, a specific ink application parameter or an RF parameter. Alternatively, the information received may be received indirectly, as in the case where the information received or input is the name or type of inkjet ink, inkjet printer or RF source to be used. In these later cases, information regarding the susceptibility of the inkjet ink (e.g., e" profile), the ink application properties (e.g., printing speed) of the printer and the RF properties (e.g., RF frequency) of the RF source may be embedded (i.e., stored) in the system and transparent to a user. Similarly, the information "selected" by the systems may be selected directly, as in the case where the selection or output of the system is a selected RF power or RF frequency or a specific e" value or range. Alternatively, the information selected may be selected indirectly, as in the case where the selection or output from the system is the name or type of ink recommended and/or the name or type of printer/RF source recommended. Again, in these later cases, information regarding the susceptibility of the inkjet ink, the ink application properties of the printer and the RF properties of the RF source may be embedded (i.e., stored) in the system and transparent to a user.

Exemplary embodiments of radiofrequency-activatable inkjet inks are provided in the following examples. The examples also demonstrate how the susceptibility profile of a given ink can be modified by the addition of ionomeric RF susceptors and how print quality may depend on the RF parameters of an RF source. The following examples are presented to illustrate the inkjet inks, methods and systems and to assist one of ordinary skill in making and using the same. The examples are not intended in any way to otherwise limit the scope of the invention.

EXAMPLES

Test Methods and Procedures

Various test methods and procedures used in the examples that follow are described below. Note that reference to a susceptor in these Examples is equivalent to a reference to an ionomer.

Measurement of RF Susceptibility of Inkjet Inks

The radiofrequency (RF) susceptibility of inkjet inks or components thereof, was measured by an Agilent E4991A impedance analyzer over a range of frequencies from 10 MHz to 240 MHz. Liquid samples were placed in a coaxial cylinder sample cell holder having an inner radius of 3.25 mm, an outer radius of 6.29 mm, and a length of 10.16 mm, and referred to as the K&D cell (FIG. 1). The theoretical capacitance of the cell whilst full of air was $8.56 \times 10^{-13}$ Farad. The liquid filled K&D cell was placed onto a fixture attached to the impedance analyzer DUT port and formed an electrical circuit. The impedance analyzer measures the in-phase (inductive) and out-of-phase (capacitive) portions of the circuit. The instrument returns the value of the capacitance of the circuit with the sample filled with liquid relative to that of the circuit with K&D cell filled with air. The ratio of these numbers gives the value of K, which is also known as the real portion of the relative permittivity of the sample in the K&D cell, The impedance analyzer also returns the value of the tangent of the phase angle of the circuit, that when multiplied by K generates the dielectric loss factor of the sample, otherwise known as e", or the imaginary portion of the relative permittivity. The value of K reflects how much of the electric field energy is stored in the sample and the value of e" reflects how much energy is lost as heat. Higher values of the e" indicate higher RF susceptibility. However, the total heat generated in a sample in the presence of an RF energy field is also a function of the frequency, f. Therefore, the total RF energy susceptibility of a sample at a known RF field frequency is proportional to the product of e" and f. Prior to measurement of the sample permittivity (K and e"), the instrument was calibrated with open, short, 50 ohm impedance, a low loss capacitor and K&D sample DUT holder.

Application of Inkjet Inks by Spray Device

Figure 2:
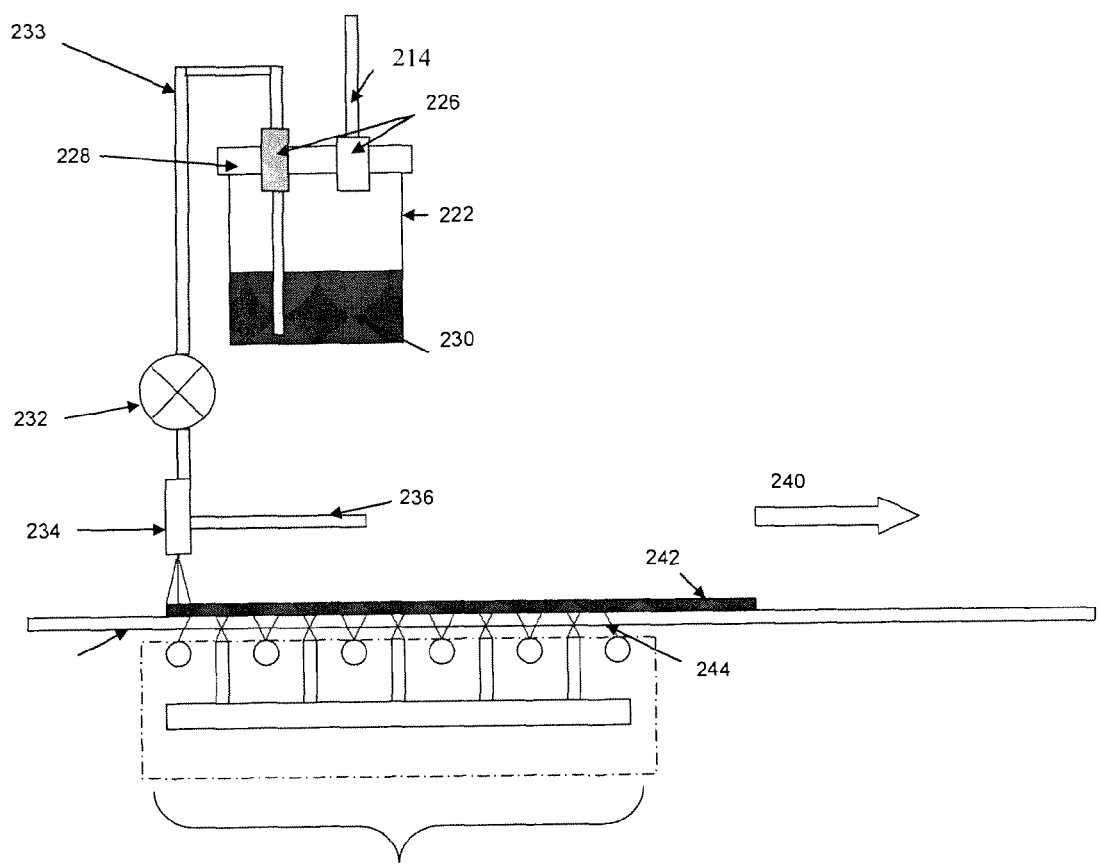
FIG. 2 is a representation of an ink application apparatus including an interdigitated probe assembly mounted with a paper transport mechanism.

An example of the ink application equipment, including an RF source comprising an interdigitated RF probe assembly mounted to the paper transport mechanism of a printer is shown in FIG. 2. Other methods of applying the ink may be used including the correct placing of ink jet cartridges or ink jet heads. In this example parts available from the Lee Company were assembled to provide a rate controllable ink application method. A 2 oz polypropylene Nalgene screw top jar 222 is pressurized with a clean dry supply of air at a pressure between 0.5 psi and 5 psi. The air may be supplied through an air inlet line 224 attached to a bulk head fitting 226 extending through a cap 228 on the jar 222. Ink 230 from the jar is supplied to the a solenoid valve 232 (e.g., through soft walled tubing 233) which provides the ink to an atomizing nozzle 234. Ink from the nozzle 234 may be sprayed onto a paper substrate 238 traveling under the nozzle in a given direction of travel 240. The applied ink 242 may be activated from below by the RF field 244 of the interdigitated probe assembly 214. The pressure of the atomizing air supply 236 and the ink application air supply are regulated and adjusted to provide the desired coating weight. The solenoid valve is used to turn on and off the supply of ink to the nozzle and the valve may be controlled by a paper sensor.

Measurement of Smudging of Inkjet Ink Print with a Wet Rub Test

Immediately following the application of inkjet ink by spray application described above, the stripe of ink was subjected to a wiping test by a cosmetic applicator. The resulting stripe of ink was observed for smearing of ink perpendicular to the sprayed stripe. The length of the wet smeared ink was measured and compared to a control done with no RF application. The smeared ink portion or the shadow of smudging that occurred when dry ink was removed from the surface of the substrate was recorded.

Method for Measuring Cockle

Paper cockle was measured as the height between the flat surface and the elevated paper section immediately after printing and RF drying, and again 30 minutes after printing. The results were recorded as 0 and 30 minute cockle values in mm.

Method for Testing Dryness of the Ink-Transfer Test

Immediately following the application of inkjet ink by spray application described above, a piece of paper substrate ((Great White inkjet presentation paper (Soft White, 98 brightness, 105 g/m², International Paper, Stamford, Conn.) was pressed onto the wet stripe of ink for 5 seconds and then removed. Any transfer to the paper strip was noted. The pick-up coverage for the ink without RF was considered to be 100%. Pick-up under conditions of various RF energy levels was reported as a fraction of the non-RF control case. Higher numbers indicated more ink-transfer.

Method for Testing Strikethrough of the Ink

After 10 minutes following spraying of ink onto a substrate, the substrate was turned over and the intensity of the ink visible on the back side of the substrate observed. This test was only done for paper substrates. The strikethrough of the control (no RF) was assigned 100%. The relative strikethrough of the samples activated by RF were reported as % color intensity of the control upon visual examination. Higher numbers indicated more strikethrough of the ink.

Method for Testing Color Intensity of the Ink

After 10 minutes following spraying of ink onto a substrate, the intensity of the color on the printed side of the substrate was noted. The intensity of the control (no RF) was denoted as 100%. The color intensity of the RF activated material was determined relative to the control. Higher numbers indicate more intense colors.

Method for Detecting Arcing of the Ink

Arcing caused by a high electric field and discharge to the substrate, between the electrodes or from local regions of the ink was noted during the tests.

Method for Determination of the Temperature of Ink

Temperature of the ink was determined at the point of exiting the RF field with an infrared pyrometer (Heitronics KT 15, Wintronics, Millington, N.J. A sample time of 10 ms was used and the average value of recorded values was reported as ink temperature.

Method for Testing Pick-up

Pick-up or transfer was determined by wiping the ink immediately after printing with the cosmetic applicator and noting the % coverage relative to a standard. The standard used for the black inks was a Canon black BCI-3e black ink (Canon USA, Lake Success, N.Y.) sprayed on Hewlett-Packard Inkjet Paper (Hewlett-Packard HP color inkjet paper, 90 g/m$^2$, 100+ brightness, Hewlett-Packard, Palo Alto, USA) with 114 Kpa air pressure on the ink, 204.6 Kpa atomizing air pressure, at a rate of 60 pages/min with an 8 mm wide strip.

Materials Used in the Examples

JONCRYL™ 682 is a low molecular weight styrene-acrylic resin available from Johnson Polymer LLC, Sturtevant, Wis. It has an acid number of 238 mg KOH/g, glass transition temperature of 56° C. and a weight average molecular weight of approximately 1700.

JONCRYL™ 690 is a high molecular weight styrene-acrylic resin available from Johnson Polymer LLC, Sturtevant, Wis. JONCRYL™ 690 has an acid number of 240 mg KOH/g, glass transition temperature of 102° C. and a weight average molecular weight of approximately 16,500.

JONCRYL™ HPD 671 is a high molecular weight styrene-acrylic resin available from Johnson Polymer LLC, Sturtevant, Wis., with an acid number of 214 mg KOH/g, glass transition temperature of 128° C. and a weight average molecular weight of approximately 17,250.

Example 1

Preparation of a Low Molecular Weight RF-Activatable Styrene-Acrylic Monomeric Susceptor This example describes the production of a styrene-acrylic resin ionomer for use in RF inkjet ink compositions. An amount of 25.424 parts by weight of JONCRYL™ 682 was neutralized with 7.926 parts of an 85 wt. % active potassium hydroxide pellets and 66.649 parts water. The resulting neutralized batch was then heated to 80° C. under nitrogen and agitated for 3 hours until a clear mixture was obtained. The resulting solution had a solids content of 30% and a pH of 13.3.

Example 2

Preparation of a Low Molecular Weight RF-Activatable Styrene-Acrylic Ionomeric Susceptor at Higher Solids This example describes the production of a styrene-acrylic resin ionomer for use in RF inkjet ink compositions of higher solids and lower pH than in example 1. An amount of 35.47 parts by weight of JONCRYL™ 682 was neutralized with 9.932 parts of a 85 wt. % active potassium hydroxide pellets and 54.598 parts water. The resulting neutralized batch was then heated to 80° C. under nitrogen and agitated for 3 hours until a clear solution was obtained. The pH was recorded and an additional 1.11 parts of KOH and 1.11 parts of resin were then added and the solution allowed to mix at 80° C. under nitrogen until a clear solution was obtained again. The resulting solution had a solids content of 41.7% and a pH of 8.9.

Example 3

Preparation of a High Molecular Weight RF-Activatable Styrene-Acrylic Ionomeric Susceptor This example describes the production of a styrene-acrylic resin ionomer for use in RF inkjet ink compositions using a higher molecular weight styrene acrylic resin. An amount of 30 parts by weight of JONCRYL™ 690 was neutralized with 8.47 parts of an 85 wt. % active potassium hydroxide pellets and 61.53 parts water. The resulting neutralized batch was then heated to 80° C. under nitrogen and agitated for 3 hours until a clear solution was obtained. The resulting solution had a solids content of 35.5% and a pH of 8.5.

Example 4

Preparation of a High Molecular Weight RF-Activatable Styrene-Acrylic Ionomeric Susceptor This example describes the production of a styrene-acrylic resin ionomer for use in RF inkjet ink compositions using a high molecular weight styrene acrylic resin suitable for dispersing pigments. An amount of 30 parts by weight of JONCRYL™ HPD 671 was neutralized with 7.55 parts of an 85 wt. % active potassium hydroxide pellets and 62.45 parts water. The resulting neutralized batch was then heated to 80° C. under nitrogen and agitated for 3 hours until a clear solution was obtained. The resulting solution had a solids content of 34.4% and a pH of 8.2.

Example 5

Calibration of Ink Flow from the Printing System

American Inkjet Cyan ink was placed in one of the Nalgene cups and air pressure was applied. The volume of liquid collected over a period of 20 seconds was recorded and the flow rate determined. The data shown in Table 1 was used in other experiments for estimation of the amount of ink from the applied air pressure.

TABLE 1

Flow Rate Calibration

| Ex. | Air Pressure, kPa | Flow, g/sec |
|---|---|---|
| 5a | 122.0 | 0.0545 |
| 5b | 115.1 | 0.0405 |
| 5c | 108.2 | 0.0295 |
| 5d | 104.7 | 0.018 |

Example 6

Permittivity of Polar Carriers

In this example, the RF susceptibility of polar carriers for inkjet inks was measured by an Agilent E4991A impedance analyzer over a range of frequencies using the method described above. Table 2 shows the data obtained for de-ionized water and glycerol. The data show that the dielectric loss (imaginary portion of the permittivity), e", of deionized water and glycerol are low compared to the dielectric constants (real portion of permittivity), K indicating that the majority of the RF electric field energy is stored and not dissipated by heat.

TABLE 2

Permittivity of Polar Carriers

| | | @ 30 MHz | | | @ 60 MHz | | |
|---|---|---|---|---|---|---|---|
| Ex. | Ingredients | K | e" | e"f | K | e" | e"f |
| 6a | Deionized water | 81.73 | 0.40 | 1.21E+07 | 82.12 | 0.29 | 1.74E+07 |
| 6b | Glycerol | 43.81 | 10.19 | 3.06E+08 | 41.54 | 17.67 | 1.06E+09 |

Example 7

Permittivity of Commercial Black Inks

In this example, commercially available black inkjet inks were measured for RF susceptibility as in Example 6. Ink cartridges were purchased at a local retailer of inks and the ink removed from the cartridge. They were tested as is without filtering. Results are show in Table 3. The e" at 60 MHz is lower than that of 30 MHz. In all cases, the RF susceptibility declines with frequency as measured by the product of e"f indicating that lower frequencies are preferred to maximize RF energy transfer. Also, the three inks showed a large variation in the value of e".

TABLE 3

Permittivity of Black Inkjet Inks

| | | @ 30 MHz | | | @ 60 MHz | | |
|---|---|---|---|---|---|---|---|
| Ex. | Ink | K | e" | E"f | K | e" | e"f |
| 7a | HP 56 Black[1] | 168.71 | 151.86 | 4.56E+09 | 113.97 | 58.73 | 3.52E+09 |
| 7b | Canon BCI-3eBK[2] | 1029.63 | 3428.07 | 1.03E+11 | 338.02 | 592.87 | 3.56E+10 |
| 7c | Epson TO26201[3] | 5273.46 | 46200.06 | 1.39E+12 | 1445.26 | 6606.94 | 3.96E+11 |

[1]Hewlett-Packard, Palo Alto, CA.
[2]Canon, Lake Success, NY.
[3]Epson, Long Beach, CA.

Example 8

Permittivity of Commercial Colored Inks

In this example, RF susceptibility of commercially available Canon colored inkjet inks were measured as in Example 6. Canon ink cartridges were purchased at a local retailer of inks and the ink removed from the cartridge. American Inkjet Cyan for Epson printers was obtained from the manufacturer. Inks were tested as is without filtering. Results are show in Table 4. The data show that the colored inks have various receptivities to the RF energy field and the RF susceptibility declines with frequency. Even within the Canon series of inkjet inks, the e" values differ for each color and differ from black.

TABLE 4

Permittivity of Colored Inkjet Inks

| | | @ 30 MHz | | | @ 60 MHz | | |
|---|---|---|---|---|---|---|---|
| Ex. | Ink | K | e" | e"f | K | e" | e"f |
| 8a | American Inkjet Cyan[1] | 390.86 | 842.98 | 2.53E+10 | 154.64 | 175.08 | 1.05E+10 |
| 8b | Canon BCI-6C Yellow[2] | 620.91 | 1608.00 | 4.82E+10 | 224.09 | 302.16 | 1.81E+10 |
| 8c | Canon BCI-6C Cyan[2] | 661.92 | 1749.24 | 5.25E+10 | 238.53 | 330.49 | 1.98E+10 |
| 8d | Canon BC16C Magenta[2] | 1440.36 | 6015.53 | 1.80E+11 | 437.31 | 945.98 | 5.68E+10 |

[1]American Inkjet, Billerica, MA.
[2]Canon, Lake Success, NY.

Example 9

Modification of a Black Pigmented Ink

In this example, commercially available Canon BCI-3eBK pigmented black inkjet ink was modified by the addition of the ionomer solution from Example 2 described above. Black ink was weighed in a mixing vessel at room temperature, and the given amount of ionomer solution added. The resulting solution was then mixed for 15 minutes with a magnetic stir bar. The solutions were then tested for RF susceptibility according to the procedure used in Example 6. Results are given in Table 5. The data show that the RF susceptibility of the pigmented black ink, as measured by K and e", can be substantially increased with the addition of ionomer solution.

TABLE 5

Permittivity of Canon Black Inkjet Inks Modified with Ionomer of Example 2

| Ex. | Parts Ink | Parts Ionomer | @ 30 MHz K | e" | e"f | @ 60 MHz K | e" | e"f |
|---|---|---|---|---|---|---|---|---|
| 9a | 100 | 0 | 1029.63 | 3428.07 | 1.03E+11 | 338.02 | 592.87 | 3.56E+10 |
| 9b | 96.4 | 3.6 | 1783.12 | 7936.63 | 2.38E+11 | 544.52 | 1284.22 | 7.71E+10 |
| 9c | 92.8 | 7.2 | 3099 | 18391 | 5.5e11 | 903 | 2840 | 1.7E+11 |

Example 10

Modification of a Canon Dye-Based Inkjet Ink

In this example, commercially available Canon BCI-6C dye-based inkjet ink was modified by the addition of the ionomer solution described in Example 2. Cyan ink was weighed in a mixing vessel at room temperature, and a known amount of ionomer solution was added. The resulting solution was then mixed for 15 minutes with a magnetic stir bar. The solution was then tested for dielectric properties as described in Example 6. Results are given in Table 6. The data show that the RF susceptibility of the dye-based Cyan ink substantially increased with the addition of ionomer solution. In addition, the data show that the RF susceptibility of the dye-based ink can be increased to that of the Canon Black BCI-3e pigmented ink, so that the RF susceptibility of the printing ink system matches.

TABLE 6

Permittivity of Canon Dye-Based Cyan Inkjet Ink Modified with Ionomer of Example 2

| Ex. | Parts Ink | Parts Ionomer Sol'n | @ 30 MHz K | e" | e"f | @ 60 MHz K | e" | e"f |
|---|---|---|---|---|---|---|---|---|
| 10a | 100 | 0 | 661.92 | 1749.24 | 5.25E+10 | 238.53 | 330.49 | 1.98E+10 |
| 10b | 93 | 7 | 2317.93 | 12406.33 | 3.72E+11 | 667.90 | 1849.53 | 1.11E+11 |

Example 11

Modification of an American Inkjet Dye-Based Inkjet Ink

In this example, a commercial dye-based inkjet ink from American Inkjet Company (Billerica, Mass.) was modified by the addition of ionomer solution described in Examples 2 and 3. Cyan ink was weighed in a mixing vessel at room temperature and a known amount of ionomer solution was added. The resulting solution was then mixed for 15 minutes with a magnetic stir bar. The solution was then tested for dielectric properties according to Example 6. Results are given in Table 7. The data show that the RF susceptibility of the dye-based Cyan ink can be substantially increased with ionomers with different composition or molecular weight.

TABLE 7

Permittivity of American Inkjet Dye-Based Cyan Inkjet Ink Modified with Ionomer of Example 2 and 3

| Ex. | Parts Ink | Parts Ionomer | Ionomer | @ 30 MHz K | e" | e"f | @ 60 MHz K | e" | e"f |
|---|---|---|---|---|---|---|---|---|---|
| 11a | 100 | 0 | 0 | 390.86 | 842.98 | 2.53E+10 | 154.64 | 175.08 | 1.05E+10 |
| 11b | 98.04 | 1.96 | Example 2 | 527.97 | 1315.28 | 3.95E+10 | 193.41 | 251.52 | 1.51E+10 |
| 11c | 96.15 | 3.85 | Example 2 | 680.96 | 1967.36 | 5.90E+10 | 234.95 | 355.13 | 2.13E+10 |
| 11d | 98.04 | 1.96 | Example 3 | 480.87 | 1134.53 | 3.40E+10 | 180.87 | 223.14 | 1.34E+10 |
| 11e | 96.15 | 3.85 | Example 3 | 604.44 | 1620.81 | 4.86E+10 | 214.86 | 302.10 | 1.81E+10 |

Example 12

RF Drying of Black Inkjet Inks on Inkjet Paper Substrate

In this example, commercially available black inkjet inks were sprayed on inkjet paper (Hewlett Packard hp color inkjet paper, 90 g/m2, 100+ brightness) with or without the addition of RF energy to dry them. The inks were applied in the equipment described and tested for pick-up using the procedures described above. The results show that as RF energy increases, the inks are less prone to pickup by the applicator. As little as 100 W is needed to reduce the pick-up on the Canon ink by 75%. Pick-up on the HP ink was not reduced by RF power. The Epson black ink is a dye-based ink compared to the pigmented Canon and HP inks and penetrates into the paper faster thus reducing the amount that can transfer to the applicator. However, this results in significantly higher strikethrough of the Epson ink on the HP paper. Ink pressure=114 kPa; Atomizing pressure=204.6 kPa; printing speed=60 page/min.

TABLE 8

Pick-up Results on HP Inkjet Paper

| Ex. | Ink | RF Power, W | RF Frequency, MHz | Spray Width, mm | Pickup |
|---|---|---|---|---|---|
| 12a | Canon BCI-3eBK[1] | 0 | 26.105 | 8 | 100 |
| 12b | Canon BCI-3eBK[1] | 100 | 26.105 | 8 | 25 |
| 12c | Canon BCI-3eBK[1] | 150 | 26.105 | 8 | 20 |
| 12d | Canon BCI-3eBK[1] | 200 | 26.105 | 8 | 25 |
| 12e | Canon BCI-3eBK[1] | 250 | 26.105 | 8 | 10 |
| 12f | Epson TO26201[2] | 0 | 26.105 | 8 | 5 |
| 12g | Epson TO26201[2] | 100 | 26.105 | 8 | 3 |
| 12h | Epson TO26201[2] | 150 | 26.105 | 8 | 0 |
| 12i | Epson TO26201[2] | 200 | 26.105 | 8 | 3 |
| 12j | Epson TO26201[2] | 250 | 26.105 | 8 | 0 |
| 12k | HP 56 Black[3] | 0 | 26.105 | 8 | 80 |
| 12l | HP 56 Black[3] | 100 | 26.105 | 8 | 75 |
| 12m | HP 56 Black[3] | 150 | 26.105 | 8 | 80 |
| 12n | HP 56 Black[3] | 200 | 26.105 | 8 | 80 |
| 12o | HP 56 Black[3] | 250 | 26.105 | 8 | 80 |

[1]Canon, Lake Success, NY.
[2]Epson, Long Beach, CA.
[3]Hewlett-Packard, Palo Alto, CA.

Example 13

RF Drying of Black Inkjet Inks on Inkjet Paper Substrate

In this example, some of the experiments in Example 12 were repeated at a lower air pressure in the inkjet ink vessel and, thus, at a lower rate of deposition of ink applied to the paper for a given paper feed rate. The ink applied was then measured for wet rub. The data show that application of only 50 watts leads to a significant reduction in wet rub smudging. At 180 watts, wet rubbing was eliminated. Application of excessive power (300 Watts) was found to lead to arcing. Ink pressure=108.2 kPa; Atomizing pressure=204.6 kPa; printing speed=60 page/min.

TABLE 9

Effect of Ink Flowrate on RF Drying of Black Inks

| Ex. | Ink[1] | RF Power, W | RF Frequency, MHz | Arcing | Spray Width, mm | Wet Rub, mm |
|---|---|---|---|---|---|---|
| 13a | Canon BCI-3eBK | 0 | 27 | No | 5 | 14 |
| 13b | Canon BCI-3eBK | 50 | 27 | No | 5 | 9 |
| 13c | Canon BCI-3eBK | 100 | 27 | No | 5 | 3 |
| 13d | Canon BCI-3eBK | 150 | 27 | No | 5 | 4 |
| 13e | Canon BCI-3eBK | 180 | 27 | No | 5 | 0 |
| 13f | Canon BCI-3eBK | 200 | 27 | No | 5 | 0 |
| 13g | Canon BCI-3eBK | 220 | 27 | No | 5 | 0 |
| 13h | Canon BCI-3eBK | 240 | 27 | No | 5 | 0 |
| 13i | Canon BCI-3eBK | 260 | 27 | No | 5 | 0 |
| 13j | Canon BCI-3eBK | 300 | 27 | Yes | 5 | 0 |

[1]Canon, Lake Success, NY.

Example 14

RF Drying of Black Inkjet Inks on Great White Paper Substrate

In this example, the experiments in Example 12 were repeated on a different type of inkjet ink paper showing that the substrate affects the performance of the ink system. RF energy can be used to improve the performance. Canon BCI-3e black inkjet ink was applied to Great White inkjet presentation paper (Soft White, 98 brightness, 105 g/m$^2$) and dried at various RF powers. Wet rub testing was conducted as described above. Smudging was completely eliminated by 150 Watts RF power on this substrate. However, application of 200 Watts was found to lead to arcing. Ink pressure=108.2 kPa; atomizing pressure=204.7 kPa; printing speed=60 page/min.

TABLE 10

| | RF Drying of Black Inks on Great White Inkjet Paper | | | | |
|---|---|---|---|---|---|
| Ex. | Ink[1] | RF Power, W | RF Frequency, MHz | Spray Width, mm | Smudge |
| 14a | Canon BCI-3eBK | 0 | 27 | 5 | 13 |
| 14b | Canon BCI-3eBK | 50 | 27 | 5 | 10 |
| 14c | Canon BCI-3eBK | 100 | 27 | 5 | 5 |
| 14d | Canon BCI-3eBK | 150 | 27 | 5 | 2 |
| 14e | Canon BCI-3eBK | 180 | 27 | 5 | 0 |
| 14f | Canon BCI-3eBK | 190 | 27 | 5 | 0 |
| 14g | Canon BCI-3eBK | 200[2] | 27 | 5 | 0 |

[1]Canon, Lake Success, NY.
[2]This sample produced arcing.

Example 15

RF Drying of Black Inkjet Inks on Photo Paper

In this example, the experiments in Example 12 were repeated on inkjet photo grade paper designed to be receptive for inkjet inks (Staples professional high gloss photo paper for all inkjet printers, Staples, Framingham, Mass.). In this example, a modified version of the method described above was used to determine wet rub. Because the intensity of the smudging was less evident compared to that on non-photo grade paper, smudging levels were determined by the length of the streaks. Smudging was significantly reduced by applying only 100 Watts RF power. However, application of 250 Watts was found to lead to arcing. It was also noted that when less than 100 watts of power was added, the ink was removed from the sprayed stripe thereby exposing the bare paper. When 100 watts or higher was used, bare paper was not revealed. Ink pressure=108.2 kPa; atomizing pressure=204.7 kPa; printing speed=60 page/min.

TABLE 11

| | RF Drying of Black Inks on Photo Paper | | | | | |
|---|---|---|---|---|---|---|
| Ex. | Ink[1] | RF Power, W | RF Frequency, MHz | Spray Width, mm | Smudge | Exposed Paper |
| 15a | Canon BCI-3eBK | 0 | 27 | 5 | 26 | Yes |
| 15b | Canon BCI-3eBK | 50 | 27 | 5 | 20 | Yes |
| 15c | Canon BCI-3eBK | 100 | 27 | 5 | 5 | No |
| 15d | Canon BCI-3eBK | 150 | 27 | 5 | 0 | No |
| 15e | Canon BCI-3eBK | 200 | 27 | 5 | 0 | No |
| 15f | Canon BCI-3eBK | 250[2] | 27 | 5 | 0 | No |

[1]Canon, Lake Success, NY.
[2]This sample produced arcing.

Example 16

RF Drying of Black Inkjet Inks on Regular Copy Paper

In this example, the experiments in Example 12 were repeated on Staples Grade Copy paper (Staples, Framingham, Mass.), not designed for inkjet inks. A strikethrough of 100% is denoted as the control for the ink without RF energy. The experiments show that strikethrough of the ink is significantly improved by only 100 Watts of RF power with increasing color intensity of the ink on the print side of the paper with increasing RF power. Ink pressure=108.2 kPa; atomizing pressure=204.7 kPa; printing speed=60 page/min.

TABLE 12

RF Drying of Black Inks on Staples Copy Paper

| Ex. | Ink[1] | RF Power, W | RF Frequency, MHz | Spray Width, mm | Strike-through | Color Intensity |
|---|---|---|---|---|---|---|
| 16a | Canon BCI-3eBK | 0 | 27 | 6 | 100 | 100 |
| 16c | Canon BCI-3eBK | 100 | 27 | 6 | 50 | 130 |
| 16d | Canon BCI-3eBK | 150 | 27 | 6 | 50 | 150 |
| 16e | Canon BCI-3eBK | 200 | 27 | 6 | 40 | 200 |
| 16f | Canon BCI-3eBK | 250 | 27 | 6 | 30 | 200 |

[1]Canon, Lake Success, NY.

Example 17

Measurement of Temperature Rise as a Function of RF Power and Ink RF Susceptibility In this example, the temperature rise of commercial inkjet inks is measured as a function of RF power applied and the paper speed. Inks of varying susceptibility as measured by e" are shown. Tests were done on inkjet paper (Hewlett Packard hp color inkjet paper, 90 g/m$^2$, 100+ brightness). The data show that increasing RF power leads to increasing ink temperature. Ink temperature reaches the boiling point of water with approximately 150 watts of power at the flow rates tested. In addition, the immediate and final cockle values are significantly reduced with the application of only 50 watts of energy. The examples shows that paper heats in the RF field. Ink pressure=109.9 kPa; atomizing pressure=204.7 kPa; nozzle height=7 mm; distance to field=0 mm; printing speed=60 page/min; RF frequency=26.37 MHz.

Example 18

RF Drying of Cyan Inks on Inkjet Paper

In this example, commercially available Cyan dye-based inkjet inks were sprayed on a commercially available inkjet paper (Great White inkjet presentation paper Soft White, 98 brightness, 105 g/m$^2$) and activated under an RF field. Canon BCI-6C cyan inkjet ink was compared to an aftermarket refill ink (JetTec 30 ml Cyan refill ink for Canon) and an ionomer modified version of the Canon BCI-6C. Strikethrough and color intensity numbers were related to controls of the same ink under no RF conditions. The data show that as RF power increases, the intensity of the color on the print side increases and the strikethrough to the opposite side of the paper decreases, indicating the ink has dried nearer to the surface of the paper. Ink pressure=108.2 kPa; Atomizing pressure=204.7 kPa; printing speed=60 page/min; RF frequency=26.74 MHz; spray width=7 mm.

TABLE 13

Temperature Rise of Black Inks as a Function of RF Power

| Ex. | Ink | RF Power, W | Strip Width, mm | Avg Temp., deg C. | STD Temp, deg C. | Cockle 0 min | Cockle 30 min | Arcing |
|---|---|---|---|---|---|---|---|---|
| 17a | n/a | 0 | 6 | 25.5 | 0.5 | | | No |
| 17b | n/a | 50 | 6 | 30.8 | 1.4 | | | No |
| 17c | n/a | 80 | 6 | 36.9 | 3.0 | | | No |
| 17d | n/a | 150 | 6 | 45.4 | 4.7 | | | No |
| 17e | n/a | 200 | 6 | 52.5 | 6.1 | | | No |
| 17f | HP 56 black | 0 | 5 | 22.14 | 0.6 | 4 | 5 | No |
| 17g | HP 56 black | 50 | 5 | 64.8 | 4.2 | 3.5 | <0.5 | No |
| 17h | HP 56 black | 80 | 5 | 85.8 | 2.8 | 3.5 | 1.5 | No |
| 17i | HP 56 black | 100 | 5 | 87.5 | 4.2 | 2 | <0.5 | No |
| 17j | HP 56 black | 130 | 5 | 94.5 | 4.5 | <0.5 | <0.5 | Yes |
| 17k | Canon BCI-3eBK | 0 | 6 | 22.9 | 0.7 | 4 | 2 | No |
| 17l | Canon BCI-3eBK | 50 | 6 | 68.2 | 4.8 | 3 | 2 | No |
| 17m | Canon BCI-3eBK | 80 | 6 | 86.4 | 9.6 | 2.5 | 1 | No |
| 17n | Canon BCI-3eBK | 100 | 6 | 89.3 | 8.2 | 1.5 | 1 | No |
| 17o | Canon BCI-3eBK | 150 | 6 | 98.7 | 4.9 | <0.5 | 1 | No |
| 17p | Canon BCI-3eBK | 175 | 6 | 99.1 | 4.9 | | | No |
| 17q | Canon BCI-3eBK | 200 | 6 | | | | | Yes |
| 17r | Epson TO26201 | 0 | 6 | 24.2 | 0.6 | 2 | <0.5 | No |
| 17s | Epson TO26201 | 50 | 6 | 70.6 | 7.6 | 1.5 | <0.5 | No |
| 17t | Epson TO26201 | 80 | 6 | 80.2 | 5.3 | 1 | <0.5 | No |
| 17u | Epson TO26201 | 100 | 6 | 86.8 | 5.3 | <0.5 | <0.5 | No |
| 17v | Epson TO26201 | 150 | 6 | 92.8 | 3 | <0.5 | <0.5 | No |
| 17w | Epson TO26201 | 200 | 6 | 98.1 | 2.9 | <0.5 | <0.5 | No |

TABLE 14

RF Drying of Cyan Inks on Great White Inkjet Paper

| Ex. | Ink | RF Power, W | Strikethrough | Color Intensity |
|---|---|---|---|---|
| 18a | Canon BCI-6C | 0 | 100 | 100 |
| 18b | Canon BCI-6C | 150 | 75 | 200 |
| 18c | Canon BCI-6C | 200 | 50 | 250 |
| 18d | Canon BCI-6C | 250 | 50 | 300 |
| 18e | Canon BCI-6C | 300 | 30 | 350 |
| 18f | JeTTec | 0 | 100 | 100 |
| 18g | JeTTec | 150 | 75 | 200 |
| 18h | JeTTec | 200 | 50 | 250 |
| 18i | JeTTec | 250 | 50 | 300 |
| 18j | JeTTec | 300 | 30 | 350 |
| 18k | Example 10b | 0 | 100 | 100 |
| 18l | Example 10b | 150 | 50 | 150 |
| 18m | Example 10b | 200 | 40 | 200 |
| 18n | Example 10b | 250 | 40 | 250 |
| 18o | Example 10b | 300 | 25 | 300 |

Example 19

RF Drying of Cyan Inks on Photo Paper

In this example, commercially available Cyan dye-based inkjet inks were sprayed on a commercially available inkjet photo paper (Great White inkjet presentation paper Soft White, 98 brightness, 105 g/m$^2$) and activated under an RF field. Canon BCI-6C cyan inkjet ink, American Inkjet Cyan ink, JetTec (30 ml Cyan refill ink for Canon), and an ionomer-modified version of the Canon BCI-6C were tested on inkjet photo paper (Staples professional high gloss photo paper for all inkjet printers). In Table 15, the sprayed ink with and without RF power was compared by wet rub testing of the streak length. In this example, wet rub smudging was measured as described above as well by a modified procedure similar to the one used for Example 15. The data show a considerable decrease in streaking and wet rub with 200 watts of RF power applied.

Cyan inks were then sprayed on the same photo paper substrate at a lower air pressure and atomizing pressure. Pick-up of the ink on to paper was then measured. The data in Table 16 show that 150 watts of power drops the pick-up of the Canon ink by 75%, but further RF energy does not decrease the pick-up rate. Bubbling of the surface for all inks occurred at 250 watts.

TABLE 15

RF Drying of Cyan Inks on Staples Grade Photo Paper1

| Ex. | Ink | RF Power, W | Wet Rub mm | Streak Length, mm |
|---|---|---|---|---|
| 19a | American Cyan | 0 | 7 | 30 |
| 19b | American Cyan | 200 | 3 | 16 |

[1]Ink pressure = 116.8 kPa; Atomizing pressure = 173.7 kPa; printing speed = 60 page/min; spray width = 6 mm; RF frequency = 26.105 MHz.

TABLE 16

RF Drying of Cyan Inks on Staples Grade Photo Paper1

| Ex. | Ink | RF Power, W | Transfer |
|---|---|---|---|
| 19c | Canon BCI-6C | 0 | 100 |
| 19d | Canon BCI-6C | 150 | 25 |
| 19e | Canon BCI-6C | 200 | 30 |
| 19f | Canon BCI-6C | 250 | 25 |

TABLE 16-continued

RF Drying of Cyan Inks on Staples Grade Photo Paper1

| Ex. | Ink | RF Power, W | Transfer |
|---|---|---|---|
| 19g | Canon BCI-6C | 300 | 30 |
| 19h | Canon BCI-6C | 350 | 25 |
| 19i | Canon BCI-6C | 400 | 25 |
| 19j | JeTTec | 0 | 100 |
| 19k | JeTTec | 150 | 25 |
| 19l | JeTTec | 200 | 30 |
| 19m | JeTTec | 250 | 30 |
| 19n | JeTTec | 300 | 20 |
| 19o | JeTTec | 350 | 10 |
| 19p | JeTTec | 400 | 15 |
| 19q | Example 10b | 0 | 100 |
| 19r | Example 10b | 150 | 50 |
| 19s | Example 10b | 200 | 50 |
| 19t | Example 10b | 250 | 40 |
| 19u | Example 10b | 300 | 30 |
| 19v | Example 10b | 350 | 20 |
| 19w | Example 10b | 400 | 30 |

[1]Ink pressure = 108.2 kPa; atomizing pressure = 204.7 kPa; printing speed = 60 page/min; RF frequency = 26.74 MHz, spray width = 5 mm.

Example 20

RF Drying of Cyan Inks on Transparency Substrate

In this example, commercially available Cyan dye-based inkjet inks were sprayed on a commercially available inkjet transparency film (Epson) and activated under an RF field. Wet rub smudging was measured as described above. Smudging was dramatically reduced at 100 watts power, but blistering of the transparency was observed at 150 watts as shown in Table 17.

The above tests were repeated with Canon Cyan ink (BCI-6) and a modified version of the ink containing ionomer. Results are given in Table 18. In this test the ionomer modified cyan ink of Example 2 obtained smudge resistance with RF energy input and was smudge-free after application of 300 watts of power. RF heating of the Canon ink at 200 watts and higher lead to bubbling on the transparency.

TABLE 17

RF Drying of Cyan Inks on Epson Transparency Film1

| Ex. | Ink | RF Power, W | Wet Rub, mm |
|---|---|---|---|
| 20a | American Cyan | 0 | 21 |
| 20b | American Cyan | 100 | 14 |
| 20c | American Cyan | 150 | 12 |
| 20d | American Cyan | 200 | 11 |

[1]Ink pressure = 116.8 kPa; atomizing pressure = 173.7 kPa; printing speed = 60 page/min; RF frequency = 26.105 MHz, spray width = 7 mm.

TABLE 18

RF Drying of Cyan Inks on Epson Transparency Film1

| Ex. | Ink | RF Power, W | Wet Rub, mm |
|---|---|---|---|
| 20e | Canon BCI-6C | 0 | 20 |
| 20f | Canon BCI-6C | 150 | 16 |
| 20g | Canon BCI-6C | 200 | 20 |
| 20h | Canon BCI-6C | 300 | 16 |
| 20i | Example 10b | 0 | 23 |
| 20j | Example 10b | 150 | 10 |

TABLE 18-continued

RF Drying of Cyan Inks on Epson Transparency Film[1]

| Ex. | Ink | RF Power, W | Wet Rub, mm |
|-----|-----|-------------|-------------|
| 20k | Example 10b | 200 | 5 |
| 20l | Example 10b | 300 | 0 |

[1]Ink pressure = 108.2 kPa; atomizing pressure = 204.7 kPa; printing speed = 60 page/min; RF frequency = 26.74 MHz, spray width = 6 mm.

What is claimed is:

1. A system for customizing inkjet ink formulation for a printing apparatus having an RF source, the system comprising:
 receiving information about at least one RF parameter of the RF source;
 receiving information about at least one ink application parameter; and
 formulating an RF inkjet ink composition having a desirable RF susceptibility profile based on the at least one RF parameter and the at least one ink application parameter.

2. The system of claim 1, wherein the RF susceptibility profile includes information about a dielectric loss value of the RF inkjet ink composition at a given radiofrequency.

3. The system of claim 2, wherein the dielectric loss value at a given radiofrequency is 1000 - 20,000 at 30 MHz.

4. The system of claim 2, wherein the dielectric loss value at a given radiofrequency is 200 - 5,000 at 60 MHz.

5. The system of claim 2, wherein the dielectric loss value at a given radiofrequency is 1000 - 20,000 at 30 MHz.

6. The system of claim 1, wherein the at least one ink application parameter is selected from the group consisting of volumetric rate of ink droplet discharge, printing speed and substrate type.

7. The system of claim 1, wherein the at least one RF parameter is selected from the group consisting of frequency, power output, load impedance match, and RF field configuration.

8. The system of claim 1, wherein the formulating comprises:
 providing a first inkjet ink comprising a first RF susceptor, the first inkjet ink having a first RF susceptibility; and
 modifying the RF susceptibility of the first inkjet ink by adding an effective amount of a second RF susceptor to the first inkjet ink to provide the RF-activatable ink having the desirable RF susceptibility profile.

9. The system of claim 8, wherein the RF inkjet ink composition comprises a colorant, and a polar carrier, and further wherein the total amount of RF susceptor is present in the second inkjet ink in an amount of about 0.1 to 10 wt. %.

10. The system of claim 8, wherein the second RF susceptor comprises a RF-activatable acrylic acid copolymer.

11. The system of claim 8, wherein the second RF susceptor is an ionomer.

12. The system of claim 8, wherein the first RF susceptor and the second RF susceptor are the same.

13. The system of claim 8, wherein the first RF susceptor and the second RF susceptor are different.

14. A method for customizing inkjet ink formulation for a printing apparatus having an RF source, the method comprising:
 receiving, at a computing device, information about at least one RF parameter of the RF source;
 receiving, at the computing device, information about at least one ink application parameter; and
 formulating, at the computing device, an RF inkjet ink composition having a desirable RF susceptibility profile based on the at least one RF parameter and the at least one ink application parameter.

15. The method of claim 14, wherein the computing device is an inkjet printer.

16. A device comprising:
 an interface configured to:
  receive information about at least one RF parameter of the RF source;
  receive information about at least one ink application parameter; and
 a processor; and
 a computer-readable medium comprising computer-readable instructions to, upon execution by the processor, formulate an RF inkjet ink composition having a desirable RF susceptibility profile based on the at least one RF parameter and the at least one ink application parameter.

17. A non-transitory computer-readable medium having stored thereon computer-executable instructions that, if executed by a computing device, cause the computing device to perform a method comprising:
 receiving information about at least one RF parameter of the RF source;
 receiving information about at least one ink application parameter; and formulating an RF inkjet ink composition having a desirable RF susceptibility profile based on the at least one RF parameter and the at least one ink application parameter.

* * * * *